3,265,561
COMPOSITION AND METHOD FOR THE CONTROL
AND DESTRUCTION OF NEMATODES
Horst Werres, Berlin-Charlottenburg, and Ernst-Albrecht
Pieroh, Berlin-Frohnau, Germany, assignors to Schering A.G., Berlin, Germany, a corporation of Germany
No Drawing. Filed Apr. 5, 1960, Ser. No. 19,989
Claims priority, application Germany, Apr. 22, 1959,
Sch 25,923
11 Claims. (Cl. 167—22)

This invention relates to a novel composition for the control and destruction of nematodes dwelling in the soil and to the method of application of said composition to nematode infested soil. More particularly the invention relates to synergistic compositions containing methyl isothiocyanate in combination with one or more other nematodicides.

In accordance with the present invention, it has been found that the activity of methyl isothiocyanate in combating nematodes can be increased to a marked degree by the combination with the methyl isothiocyanate of other materials known to possess nematodicidal activity, and that this increase in activity is synergistic in character. For the purpose of forming synergistic mixtures of methyl isothiocyanate, one or more of the following nematodicides have been found to be especially well suited: carbon bisulfide, ethylene dibromide, chlorpicrin, 1,3-dibromopropane, methylene chloride, 1,3-dichloropropene, 1,2-dichloropropane, mixtures of 1,3-dichloropropene and 1,2-dichloropropane, carbamates such as mono- or dithio-carbamates which may be esters or salts, esters of phosphoric acid such as for example O-2,4-dichlorphenyl-O,O-diethylphosphorothionate, and the like.

The nematodicidal mixtures of the present invention may be applied to nematode infested soil in any of the forms in which nematodicides are conventionally prepared for this purpose, either as much in solid form or in parasiticidal amounts in admixture with a solid diluent or carrier, or in solution or suspension in water or organic solvents.

Although literature references have indicated that various other isothiocyanate possessed nematodicidal action, none has ever been utilized in practice for this purpose, since every one of the isothiocyanates previously proposed is toxic to plants. In accordance with the present invention it was found that methyl isothiocyanate exhibits not only a far greater activity against soil dwelling nematodes and fungi than any of the isothiocyanates previously suggested for this purpose, and indeed far exceeds in effectiveness the conventional commercial preparations used as soil disinfectants, but that this unique effectiveness is still further enhanced by combining with the methyl isothiocyanate other nematodicides whereby the phenomenon of synergism is surprisingly and unexpectedy manifested. At the same time, the methyl isothiocyanate and its synergistic combinations exhibit low toxicity toward plants.

In preparing the novel combinations of methyl isothiocyanate and synergist in accordance with this invention, the proportions of the respective components can be varied within wide limits. In many instances it is possible to obtain increased activity on the part of the methyl isothiocyanate with addition of only small amounts to the other nematodicide. On the other hand, true synergism can be achieved by the presence of comparatively small amounts of the synergist compound in the methyl isothiocyanate, for example, where carbon bisulfide is the synergist.

In accordance with the present invention, it has been found that an amount of about 50% to about 0.5% of methyl isothiocyanate contained in the mixture is most favourable, but for certain purposes it may be advisable to use even higher percentages of methylisothiocyanate up to the upper limit of the solubility of methyl isothiocyanate in the solvent used. Low percentages of methyl isothiocyanate may be favourable in order to increase the action of another nematodicide to 100%, if otherwise this may only be attained by high dosage. The particular proportions which are most effective in any given application can be determined by the person skilled in the art in accordance with the extent of kill which is desired to achieve. In case of three component mixtures the amounts may be varied accordingly.

As will be apparent from the test results presented below, the extent of synergism is surprisingly high. Thus, for example, the 60% kill attainable by the application to nematode infested soil of methyl isothiocyanate in a concentration of 30 mg. per liter of soil, is increased to 99.6% kill by the addition of 30 mg. of carbon bisulfide. The 50% kill exhibited by the application of 20 mg. per liter of soil of methyl isothiocyanate is raised to 97.7% kill by adding 20 mg. per liter of soil of carbon bisulfide to the methyl isothiocyanate.

It will be seen from the last portion of Table 1 that this remarkable activity is specific to methyl isothiocyanate. Thus, 1,3-dibromopropane and ethylene dibromide do not synergize, and in fact they act antagonistically, showing poorer results in combination than individually.

The manufacture of methyl isothiocyanate, which is a known compound, may be carried out according to conventional methods. It can be prepared, for example, by the transformation of methyl thiocyanate, by molecular rearrangement.

The methyl isothiocyanate compositions of the present invention may be applied to soil for the destruction of nematodes and fungi in any suitable form. The combinations of methyl isothiocyanate and other nematodicide or nematodicides can be used either as such or in admixture with a solid inert carrier, such as for example, fuller's earth or diatomaceous earth, or the like, in parasiticidal amounts. They can also be used in parasiticidal amounts in solutions of any desired concentration. Although the solution concentration may have as its upper limit the solubility of the methyl isothiocyanate or other ingredient of the combination in the particular solvent or solvent mixture used, the active ingredients may be present in a wide range of concentrations below this limit. Thus, fairly dilute solutions may be employed. The choice of solvents and concentrations is directed toward providing, in the soil to be disinfected, a minimal amount of about 15 to 40 mg. of methyl isothiocyanate per liter of soil. The amount of the applied disinfectant is however dependent on the degree of infection of the soil by nematodes, the extent of kill which is desired to achieve, the type of nematodes and therefore it is possible to extend the above mentioned range over its upper or lower limit.

A large number of solvents may be used for the preparation of disinfectant solutions of methyl isothiocyanate combinations with other nematodicides, the only requirements being that the solvents be inert toward these compounds. Suitable inert solvents or diluents include normally liquid aliphatic and aromatic hydrocarbons, such as, for example, benzine, hexane, toluene, and xylene, or mixtures of such solvents. Chlorinated hydrocarbons may be employed, such as, for example ethylene dichloride, trichlorethylene, chloroform, chloro tert. butanol, 3-chloro-2 methylpropene, chlorbenzene, and others. Other solvents which may be employed include nitrobenzene, acetone, and acetonitrile.

The methyl isothiocyanate compositions of the invention may also be applied in the form of an emulsion. For this, any suitable type of emulsifying agent may be employed, of which the following examples are given, but are not to be regarded as limiting: alkylphenolpolyglycol ethers (Type IVD) with a medium degree of hydroxyethylation, or Type SBK, with a lower degree of hydroxyethylation; Emulsogen A (a fatty acid polyglycol ester); Atlox 81 (polyoxyethylene sorbitan monooleate); Atlox 2065 and 2085 sulfonated oil with polyoxyethylene sorbitol ester) and others.

The tests described in the examples given below were carried out in accordance with the following general procedure, using as the test organism, rootknot nematode (Meloidogyne sp.). A solution in xylene of the composition was added to a 1 liter glass test jar to the middle of the glass. The test jars were filled with compost soil, moisture content 22%, which was strongly infested with rootknot nematode. The test jars were stored for 10 days at a soil temperature of 13–15° C., without covering the soil. After this idle time, tomato seeds were introduced into the treated soil and a cultivation period of 30 days at a soil temperature of 23–26° C. followed. Following this cultivation period, an evaluation was made of the nematodicidal action in terms of rootknot occurrence on the roots, corresponding to number of nematodes per root.

Table 1 illustrates the synergistic activity obtained by treatment of infested soil with (a) two concentrations of methyl isothiocyanate and of carbon bisulfide, and of equal proportions of these substances in combination, (b) methyl isothiocyanate and dibromopropane, separately and in combination, and (c) 1,3-dibromopropane and ethylene dibromide individually and in combination, when applied to soil in various concentrations measured in terms of mg. of active substance per liter of soil. Referring to part (a) it will be seen that, whereas 30 mg. per liter of methyl isothiocyanate produced 60% nematodicidal action, and 30 mg. of carbon bisulfide per liter produced zero action, the combination of 30 mg. of each compound produced 99.1% kill. This approaches the effect of 100% kill obtained with methyl isothiocyanate alone in a concentration of 60 mg. per liter of soil, and thus enables an important saving to be made of the much more costly methyl isothiocyanate. A similar synergistic effect is shown in the case of methyl isothiocyanate in combination with an equal amount of dibromopropane, which by itself showed less than a 21.6% kill. In contrast thereto, and illustrating the unique and specific character of the effect obtained with methyl isothiocyanate, portion (b) of Table 1 shows that when mixed with ethylene dibromide, which by itself has an effectiveness of about 89%, dibromopropane actually causes a reduction in the nematodicidal activity of the ethylene dibromide, although it has the opposite effect when used with methyl isothiocyanate.

TABLE 1.—ACTION OF METHYL ISOTHIOCYANATE AND COMBINATIONS

[Solutions of 20% active substance in xylene]

| Mg. Active Substance/ Liter Soil | | Nematodicidal Action (Percent) |
|---|---|---|
| Methyl Isothiocyanate | Carbon Bisulfide | |
| 60 |  | 100 |
|  | 60 | 36.7 |
| 30 |  | 60 |
|  | 30 | 0 |
| 30 | 30 | 99.1 |
| 40 |  | 98.7 |
|  | 40 | 0 |
| 20 |  | 50 |
|  | 20 | 0 |
| 20 | 20 | 99.6 |
|  | Dibromopropane | |
| 60 |  | 100 |
|  | 60 | 21.6 |
| 30 |  | 60 |
|  | 30 | 21.6 |
| 30 | 30 | 95.2 |
| 1,3-dibromopropane | Ethylene Dibromide | |
| 100 |  | 48.7 |
|  | 100 | 88.5 |
| 50 | 50 | 44.7 |
| 80 |  | 60 |
|  | 80 | 89.2 |
| 40 | 40 | 20.6 |
| 60 |  | 16.5 |
|  | 60 | 75.7 |
| 30 | 30 | 16.2 |
| 40 |  | 22.1 |
|  | 40 | 80 |
| 20 | 20 | 2.1 |

The following examples illustrate the application of methyl isothiocyanate in combination with other nematodicides in solution in xylene to nematode infested soil. The concentrations of the parasticides are given in percent by weight. The amounts of solution applied to the soil are given in mg. per liter of soil. The examples are not, however, to be regarded as limiting in any way.

*Example 1*

As described above, solutions of methyl isothiocyanate, chlorpicrin, and of a mixture of these substances, in xylene, were applied to nematode infested soil, in amounts ranging from 100 to 250 mg. per liter of soil. The solutions of the individual compounds were 10% concentration by weight; the solution of the two substances together contained 10% by weight of each parasiticide. The results are summarized in the following table:

TABLE 2

| Xylene Solution | Mg. of composition per liter of soil | | |
|---|---|---|---|
|  | 100 | 150 | 200 |
| 10% Methyl isothiocyanate | 0 | 18.2 | 55.1 |
| 10% Chlorpicrin | 0 | 0 | 25.3 |
| 10% Methyl isothiocyanate plus 10% Chlorpicrin | 63.0 | 88.7 | 98.3 |

The results in the foregoing table show that even at 100 mg. treatment levels, at which each separate compound had virtually no effect, their combination was 63.0% effective.

*Example 2*

Proceeding in a manner similar to that of Example 1, there were applied to soil solutions of 10% by weight of each of methyl isothiocyanate and "DD" Mixture, a commercial nematodicide consisting of a mixture of 1,3-dichloropropene and 1,2-dichloropropane, and a solution of 10% by weight of each compound in xylene. The results are shown in Table 3:

TABLE 3

| Xylene Solution | Mg. of composition per liter of soil | | | |
|---|---|---|---|---|
| | 100 | 150 | 200 | 250 |
| | Nematodicidal action (percent) | | | |
| 10% Methyl isothiocyanate | 0 | 18.2 | 55.1 | 91.8 |
| 10% "DD" Mixture | 0 | 0 | 0 | 0 |
| 10% Methyl isothiocyanate plus 10% "DD" Mixture | 30.0 | 40.7 | 91.8 | 97.3 |

The results demonstrated in Table 3 are even more striking in that "DD" Mixture, a product having virtually no nematodicidal action by itself at the concentration applied, acts to synergize methyl isothiocyanate so as to multiply its effectiveness several times, even where the latter compound is in low concentration in the soil.

Example 3

Proceeding in a manner similar to that of Examples 1 and 2, tests were made with solutions of methyl isothiocyanate and O-2,4-dichlorophenyl-O,O-diethylphosphorothionate, and of the combination of these compounds. The results are summarized in Table 4:

TABLE 4

| Xylene Solution | Mg. of composition per liter of soil | | |
|---|---|---|---|
| | 150 | 200 | 250 |
| 10% Methyl isothiocyanate | 18.2 | 55.1 | 91.8 |
| 10% O-2,4-dichlorphenyl-O,O-diethylphosphorothionate | 0 | 0 | 0 |
| 10% Methyl isothiocyanate plus 10% O-2,4-dichlorphenyl-O,O-diethylphosphorothionate | 86.2 | 95.7 | 96.6 |

Example 4

This example illustrates the extraordinary and unexpected synergistic effect produced with a three-component mixture of methyl isothiocyanate, carbon bisulfide, and methylene chloride, dissolved in xylene as an inert diluent. Neither the carbon bisulfide, methylene chloride, or the xylene exhibit any significant nematodicidal activity by themselves, nor in admixture, even at concentrations well in excess of the figures utilized in this and the other examples, as shown in Table 5:

TABLE 5

| Compound Applied | Mg. of composition per liter of soil | | |
|---|---|---|---|
| | 100 | 150 | 200 |
| 20% CS₂ plus 80% Xylene | 0 | 0 | 0 |
| 100% CH₂Cl₂ | 0 | 0 | 0 |
| 20% CS plus 80% CH₂Cl₂ | 0 | 0 | 0 |
| 100% Xylene | 0 | 0 | 0 |

To the extent that the carbon bisulfide or the methylene chloride may exhibit nematodicidal activity, they will synergistically increase the activity of methyl isothiocyanate to an even greater extent.

Table 6 demonstrates the high synergistic effect of the combination of the methyl isothiocyanate, carbon bisulfide, and methylene chloride, showing a fourfold increase in action of the methyl isothiocyanate when the composition is applied to infested soil at a concentration of 150 mg. per liter, and a doubling at a concentration of 200 mg. of preparation per liter of soil, even though the additives individually have no effect in the range of the concentrations applied.

TABLE 6

| Solution in Xylene, percent | | | Mg. of composition per liter of soil | | |
|---|---|---|---|---|---|
| M.I.[1] | CS₂ | CH₂Cl₂ | 100 | 150 | 200 |
| 10 | | | 0 | 18.2 | 55.1 |
| | 2 | | 0 | 0 | 0 |
| | | 38 | 0 | 0 | 0 |
| 10 | 2 | 38 | 57.7 | 86.8 | 91.7 |
| 10 | | | 0 | 18.2 | 55.1 |
| | 5 | | 0 | 0 | 0 |
| | | 35 | 0 | 0 | 0 |
| 10 | 5 | 35 | 45.3 | 76.1 | 95.7 |
| 10 | | | 0 | 18.2 | 55.1 |
| | 10 | | 0 | 0 | 0 |
| | | 30 | 0 | 0 | 0 |
| 10 | 10 | 30 | 65.6 | 89.3 | 91.4 |

[1] Methyl Isothiocyanate.

Example 5

This example illustrates the synergistic effect of mixtures containing lower percentages of methyl isothiocyanate. The preparations contained methyl isothiocyanate (MI) in solution of a mixture of 1,3-dichloropropene and 1,2-dichloropropane (DD). Following the general procedure given above the test jars were stored at a temperature of 10–11° C. and cultivated at 24–26° C. The evaluation of the tests gave for the rootknot occurrence (in percent) the results shown in the following table.

TABLE 7

| Ratio of MI:DD | Mg. active substance/l. soil | | Nematodicidal Action (percent) |
|---|---|---|---|
| | MI | DD | |
| 1:4 | 10 | | 0 |
| | | 40 | 0 |
| | 10 | 40 | 50 |
| | 15 | | 27 |
| | | 60 | 0 |
| | 15 | 60 | 76 |
| | 20 | | 50 |
| | | 80 | 0 |
| 1:5.7 | 20 | 80 | 91 |
| | 11.25 | | 0 |
| | | 63.75 | 0 |
| | 11.25 | 63.75 | 51 |
| | 15 | | 27 |
| | | 85 | 0 |
| 1:9 | 15 | 85 | 73 |
| | 10 | | 0 |
| | | 90 | 0 |
| | 10 | 90 | 48 |
| | 15 | | 27 |
| | | 135 | 0 |
| 1:19 | 15 | 135 | 78 |
| | 7.5 | | 0 |
| | | 142.5 | 0 |
| | 7.5 | 142.5 | 59 |
| | 10 | | 0 |
| | | 190 | 30 |
| 1:99 | 10 | 190 | 73 |
| | 5 | | 0 |
| | | 495 | 83 |
| | 5 | 495 | 97 |
| | 6 | | 0 |
| | | 594 | 88 |
| | 6 | 594 | 99 |

As a preparation containing "DD" alone, reaches a nematodicidal effect of 100% only at so high dosages as 800–900 mg. it is very favourable that according to the present invention it is possible to save a great deal of this component by the addition of only very slow amounts of methyl isothiocyanate, as shown above.

We claim:

1. The method for controlling soil dwelling nematodes which comprises impregnating nematode infested soil with a solution comprising a mixture of equal parts by weight of methyl isothiocyanate and dibromopropane in an inert volatile organic liquid diluent.

2. The method for controlling soil dwelling nematodes which comprises impregnating nematode infested soil with a solution comprising a mixture of equal parts by weight of methyl isothiocyanate and O-2,4-dichlorphenyl-O,O-diethylphosphorothionate in an inert volatile organic liquid diluent.

3. The method of controlling soil dwelling nematodes which comprises impregnating nematode infested soil with a solution comprising a mixture of equal parts by weight of methyl isothiocyanate and a compound selected from the group consisting of carbon bisulfide, dibromopropane, chloropicrin, and O-2,4-dichlorophenyl-O-O-diethyl phosphorothionate and three parts of methylene chloride.

4. The composition for controlling soil dwelling nematodes comprising a mixture of equal parts by weight of methyl isothiocyanate and a compound selected from the group consisting of carbon bisulfide, dibromopropane, chloropicrin, and O-2,4-dichlorophenyl-O,O-diethyl phosphorothionate and three parts of methylene chloride.

5. The method for controlling soil dwelling nematodes which comprises impregnating nematode infested soil with a solution comprising a mixture of equal parts by weight of methyl isothiocyanate and carbon bisulfide.

6. The method of controlling soil dwelling nematodes which comprises impregnating nematode infested soil with a solution comprising a mixture of equal parts by weight of methyl isothiocyanate and chloropicrin.

7. The composition for controlling soil dwelling nematodes which comprises an equal mixture by weight of methyl isothiocyanate and carbon bisulfide in an inert volatile organic liquid diluent.

8. The composition for controlling soil dwelling nematodes comprising a solution comprising by weight one part of methyl isothiocyanate, one part of carbon bisulfide and three parts of methylene chloride.

9. The composition for controlling soil dwelling nematodes comprising a solution containing by weight one part of methyl isothiocyanate and one part of dibromopropane.

10. The composition for controlling soil dwelling nematodes which comprises by weight equal parts of methyl isothiocyanate and O-2-4 dichlorophenyl-O,O diethyl phosphorothionate.

11. The composition for controlling soil dwelling nematodes which comprises by weight equal parts of methyl isothiocyanate and chloropicrin.

References Cited by the Examiner

Frear, Chemistry of Insecticides, Fungicides and Herbicides, 2nd Ed., 1948, pp. 111–113, 116 and 122.

Hanna, Handbook of Agricultural Chemicals, 2nd Ed. (1958), pp. 149, 156.

JULIAN S. LEVITT, *Primary Examiner.*

MORRIS O. WOLK, *Examiner.*

G. A. MENTIS, *Assistant Examiner.*